(12) United States Patent
Walters et al.

(10) Patent No.: US 6,791,306 B2
(45) Date of Patent: Sep. 14, 2004

(54) SYNTHETIC RIPPLE REGULATOR

(75) Inventors: Michael M. Walters, Apex, NC (US); Vladimir Muratov, Manchester, NH (US); Stefan Wlodzimierz Wiktor, Raleigh, NC (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 10/236,787

(22) Filed: Sep. 6, 2002

(65) Prior Publication Data

US 2003/0142519 A1 Jul. 31, 2003

Related U.S. Application Data

(60) Provisional application No. 60/352,683, filed on Jan. 29, 2002.

(51) Int. Cl.[7] .................................................. G05F 1/40
(52) U.S. Cl. ...................... 323/288; 323/282; 323/285
(58) Field of Search ............................ 363/89, 95, 97, 363/98, 16, 132, 127; 323/282, 283, 284, 286, 285, 288, 290

(56) References Cited

U.S. PATENT DOCUMENTS

| 4,413,224 A | 11/1983 | Krupka et al. ............... 323/284 |
| 4,521,726 A | 6/1985 | Budnik ......................... 323/283 |
| 4,658,204 A | 4/1987 | Goodwin ...................... 323/285 |
| 5,399,958 A | 3/1995 | Iyoda ........................... 323/282 |
| 6,147,478 A * | 11/2000 | Skelton et al. ............... 323/288 |
| 6,433,525 B2 * | 8/2002 | Muratov et al. .............. 323/282 |
| 6,583,610 B2 * | 6/2003 | Groom et al. ................ 323/288 |

FOREIGN PATENT DOCUMENTS

| DE | 3343883 A1 | 6/1984 | ............. G05F/1/56 |
| DE | 4206478 A1 | 9/1993 | ............. H02M/3/10 |
| EP | 0650250 A1 | 8/1994 | .......... H02M/3/156 |
| EP | 0883051 A1 | 6/1998 | ........... G05F/1/575 |
| EP | 1073187 A2 | 7/2000 | .......... H02M/3/156 |
| FR | 2610149 A1 | 7/1998 | .......... H02M/3/156 |

* cited by examiner

Primary Examiner—Rajnikant B. Patel

(57) ABSTRACT

A synthetic ripple regulator for a DC—DC converter generates an auxiliary voltage waveform that effectively replicates the waveform ripple current through an output inductor, and uses the auxiliary voltage waveform to control toggling of a hysteretic comparator. In a non-limiting implementation, a transconductance amplifier monitors the voltage across the inductor, and supplies an inductor voltage-representative current to a ripple waveform capacitor, so as to produce the auxiliary voltage waveform. Using the replicated inductor current for ripple regulation results in low output ripple, input voltage feed forward, and simplified compensation.

4 Claims, 3 Drawing Sheets

SYNTHETIC RIPPLE REGULATOR

CROSS-REFERENCE TO RELATED APPLICATION

The present application claims the benefit of now abandoned Provisional Patent Application, Ser. No. 60/352,683, filed Jan. 29, 2002, entitled: "Synthetic Ripple Regulator," by M. Walters et al, assigned to the assignee of the present application and the disclosure of which is incorporated herein.

FIELD OF THE INVENTION

The present invention relates in general to power supply circuits and components therefor, and is particularly directed to a synthetic ripple regulator for a DC—DC converter. The synthetic ripple regulator of the invention generates an artificial or synthesized ripple waveform that controls the switching operation of the converter, reducing output ripple and improving DC accuracy.

BACKGROUND OF THE INVENTION

Electrical power for integrated circuits is typically supplied by one or more direct current (DC) power sources. In a number of applications the circuit may require plural regulated voltages that are different from the available supply voltage (which may be relatively low e.g., on the order of three volts or less, particularly where low current consumption is desirable, such as in portable, battery-powered devices). Moreover, in many applications the load current may vary over several orders of magnitude. To address these requirements it has been common practice to employ pulse or ripple generator-based converters, such as a hysteresis or 'bang—bang' converter of the type shown in FIG. 1.

Such a ripple regulator-based DC—DC voltage converter employs a relatively simple control mechanism and provides a fast response to a load transient. The switching frequency of the ripple regulator is asynchronous, which is advantageous in applications where direct control of the switching frequency or the switching edges is desired. For this purpose, the ripple regulator of FIG. 1 employs a hysteresis comparator 10, that controls a gate drive circuit 20, respective output drive ports 22 and 23 of which are coupled to the control or gate drive inputs of a pair of electronic power switching devices, respectively shown as an upper P-MOSFET (or PFET) device 30 and a lower N-MOSFET (or NFET) device 40. These FET switching devices have their drain-source paths coupled in series between first and second reference voltages (Vdd and ground (GND)).

The gate drive circuit 20 controllably switches or turns the two switching devices 30 and 40 on and off, in accordance with a pulse width modulation (PWM) switching waveform (such as that shown at PWM in the timing diagram of FIG. 2) supplied by comparator 10. The upper PFET device 30 is turned on and off by an upper gate switching signal UG applied by the gate driver 20 to the gate of the PFET device 20, and the NFET device 30 is turned on and off by a lower gate switching signal LG applied by the gate driver 20 to the gate of the NFET device 30.

A common or phase voltage node 35 between the two power FETs 30/40 is coupled through an inductor 50 to a capacitor 60, which is referenced to a prescribed potential (e.g., ground (GND)). The connection 55 between the inductor 50 and the capacitor 60 serves as an output node, from which an output voltage output (shown as triangular waveform output in FIG. 2) is derived. In order to regulate the output voltage relative to a prescribed reference voltage, the output node is coupled to a first, inverting (−) input 11 of the hysteresis comparator 10, a second, non-inverting (+) input 12 of which is coupled to receive a DC Reference voltage.

In such a hysteretic or 'bang—bang' regulator, the output PWM signal waveform produced by hysteresis comparator 10 transitions to a first state (e.g., goes high) when the output voltage Vout at node 55 falls below the reference voltage Reference (minus the comparator's inherent hysteresis voltage Δ); the comparator's PWM output transitions to a second state (e.g., goes low) when the output voltage Vout exceeds the reference voltage plus the hysteresis voltage Δ. The application of or increase in load will cause the output voltage (Vout) to decrease below the reference voltage, in response to which comparator 10 triggers the gate drive to turn on the upper switching device 30. Because the converter is asynchronous, the gate drive control signal does not wait for a synchronizing clock, as is common in most fixed frequency PWM control schemes.

Principal concerns with this type of ripple regulator include large ripple voltage, DC voltage accuracy, and switching frequency. Since the hysteretic comparator 10 directly sets the magnitude of the ripple voltage Vout, employing a smaller hysteresis Δ will reduce the power conversion efficiency, as switching frequency increases with smaller hysteresis. In order to control the DC output voltage, which is a function of the ripple wave shape, the peak 71 and the valley 72 of the output ripple voltage (Output, shown in FIG. 2) is regulated. For the triangular wave shape shown, the DC value of the output voltage is a function of the PWM duty factor. The output voltage wave shape also changes at light loads, when current through the inductor 50 becomes discontinuous, producing relatively short 'spikes' between which are relatively long periods of low voltage, as shown by the DISCON waveshape in FIG. 2. Since the ripple voltage wave shape varies with input line and load conditions, maintaining tight DC regulation is difficult.

In addition, improvements in capacitor technology will change the ripple wave shape. In particular, the current state of ceramic capacitor technology has enabled the equivalent series resistance or ESR (which produces the piecewise linear or triangular wave shape of the output voltage waveform shown in FIG. 2) of ceramic capacitors to be reduced to very low values. At very low values of ESR, however, the output voltage's ripple shape changes from triangular to a non-linear shape (e.g., parabolic and sinusoidal). This causes the output voltage to overshoot the hysteretic threshold, and results in higher peak-to-peak ripple. As a result, the very improvements that were intended to lower the output voltage ripple in DC—DC converters can actually cause increased ripple when used in a ripple regulator.

SUMMARY OF THE INVENTION

In accordance with the present invention, shortcomings of conventional ripple regulators, including those described above, are effectively obviated by means of a synthetic ripple regulator, which is operative to generate an auxiliary voltage waveform, such as one that effectively replicates or mirrors the waveform ripple current through the output inductor, and uses this auxiliary voltage waveform to control toggling of the hysteretic comparator. Using such a reconstructed current for ripple regulation results in low output ripple, input voltage feed forward, and simplified compensation.

The auxiliary voltage waveform may be readily generated by coupling the voltage across the inductor to a transconductance amplifier, the output of which feeds a 'ripple voltage' capacitor with a ramp current that is proportional to the voltage across the inductor. Since the voltage across a current-driven capacitor is equivalent to the current through a voltage-driven inductor, driving the ripple capacitor with a current proportional to the voltage across the inductor provides the desired waveform shape for controlling the hysteresis comparator. For a step input voltage change, the ramp current will change proportionally, to modify the conduction interval of the power switching devices.

An error amplifier is inserted upstream of the hysteresis comparator and is coupled to receive the regulating reference voltage. The error amplifier serves to increase DC regulation accuracy, providing high DC gain to reduce errors due to ripple wave shape, various offsets, and other errors. The output of the error amplifier follows the load current and is fed to the reference input of the hysteresis comparator.

DETAILED DESCRIPTION

Before describing a non-limiting, but preferred embodiment of the synthetic ripple regulator of the present invention, it should be observed that the invention resides primarily in an arrangement of conventional circuit components, and the manner in which they may be incorporated into a hysteretic controller of the type described above. It is to be understood that the invention may be embodied in a variety of other implementations, and should not be construed as being limited to only the embodiment shown and described herein. Rather, the implementation example shown and described here is intended to supply only those specifics that are pertinent to the present invention, so as not to obscure the disclosure with details that are readily apparent to one skilled in the art having the benefit of present description. Throughout the text and drawings like numbers refer to like parts.

Figure 3:
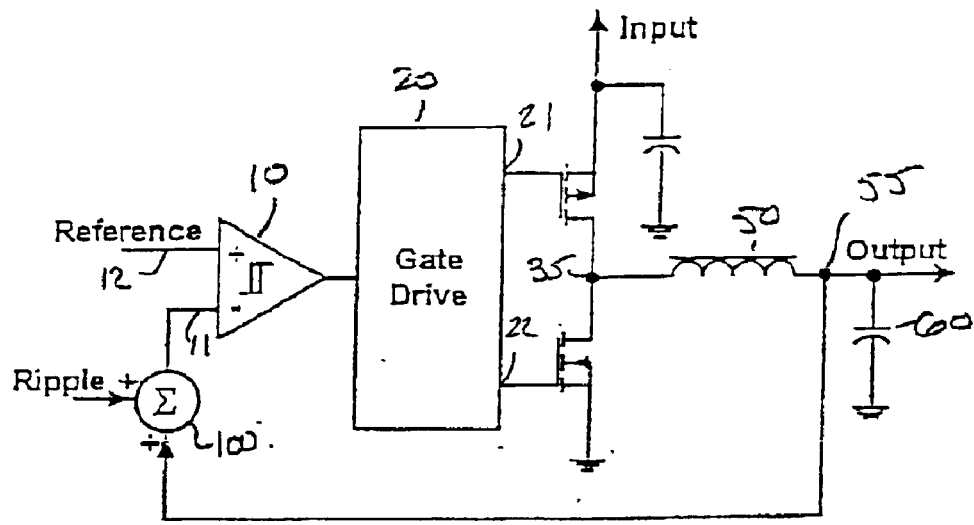
FIG. 3 diagrammatically illustrates the general architecture of a synthetic ripple regulator in accordance the present invention.

Attention is now directed to FIG. 3, which diagrammatically illustrates the general architecture of a synthetic ripple regulator in accordance the present invention. As described briefly above, and as shown by summation unit 100 in FIG. 3, the synthetic ripple regulator according to the present invention injects an auxiliary ripple voltage (Ripple) into the feedback path to input 11 of hysteretic comparator 10, so as to be combined with the output voltage at node 55. This auxiliary waveform is to be synchronized to the switching intervals of the converter, and have a shape corresponding to that of the current waveform in the inductor which, in the present example, is a triangular wave shaped ripple current.

Such a voltage waveform may be readily generated by noting that the current through a voltage-driven inductor is equivalent to the voltage across a current-driven capacitor in accordance with equation (1) as follows:

$$i_L(t) = \frac{1}{L} \int v_L * dt$$

$$i_L(t) = \frac{1}{L}\left[\int_o^{t_{ON}} (Input - Output) dt - \int_{t_{ON}}^{T} Output * dt\right] \quad (1)$$

$$v_C(t) = \frac{1}{C} \int i_C * dt \quad (2)$$

Also the voltage across a capacitor is described by equation (2) as:

Driving a capacitor with a current proportional to the voltage across the inductor provides the desired waveform shape. During the interval $t_{on}$, the driving current $I_C$ to the capacitor is proportional to the 'Input' less the 'Output' and proportional to the 'Output' during the remaining Interval $(T-t_{on})$.

Figure 4:
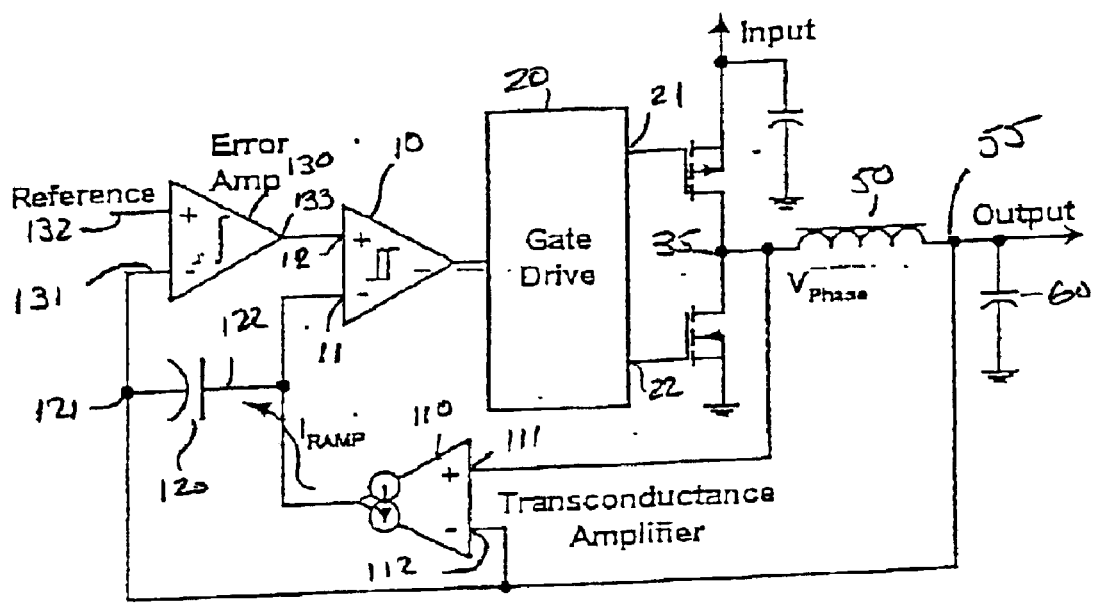
FIG. 4 diagrammatically illustrates a non-limiting implementation of the synthetic ripple regulator of FIG. 3.

A non-limiting implementation of generating such a ripple waveform for injection in the synthetic ripple regulator of FIG. 3 is diagrammatically illustrated in FIG. 4 as comprising a transconductance amplifier 110 coupled with a 'ripple voltage' capacitor 120. The transconductance amplifier 110 produces an output current $I_{RAMP}$ proportional to the voltage across the inductor 50 in accordance with equation (1). The ripple voltage capacitor 120 transforms this current into an inductor current-representative voltage having the desired waveform shape. A benefit of synthesizing the ripple waveform based on inductor current is the inherent feed-forward characteristic. For a step input voltage change, the current $I_{RAMP}$ will change proportionally to modify the conduction interval of the power switching devices.

For this purpose, transconductance amplifier 110 has a first, non-inverting (+) input 111 coupled to the phase node 35 at one end to inductor 50, and a second (−) input 112 coupled to the output voltage node 55 at the other end of the inductor, so that the transconductance amplifier 10 'sees' the voltage across the inductor. The output voltage node 55 is further coupled to a first terminal 121 of capacitor 120 and to the inverting (−) input 131 of an error amplifier 130 inserted upstream of the hysteresis comparator 10. The error amplifier 130 serves to increase the DC regulation accuracy, providing high DC gain to reduce errors due to ripple wave shape, various offsets, and other errors. Error amplifier 130 has a second, non-inverting (+) input 132 thereof coupled to receive the voltage Reference, while its output 133 is coupled to the non-inverting (+) input 12 of hysteresis comparator 10. In the configuration of FIG. 4, the output of the error amplifier 130 follows the load current. The transconductance amplifier 110 has its output coupled to a second terminal 122 of the capacitor 120 and to inverting (−) input 11 of the hysteresis comparator 10.

Figure 5:
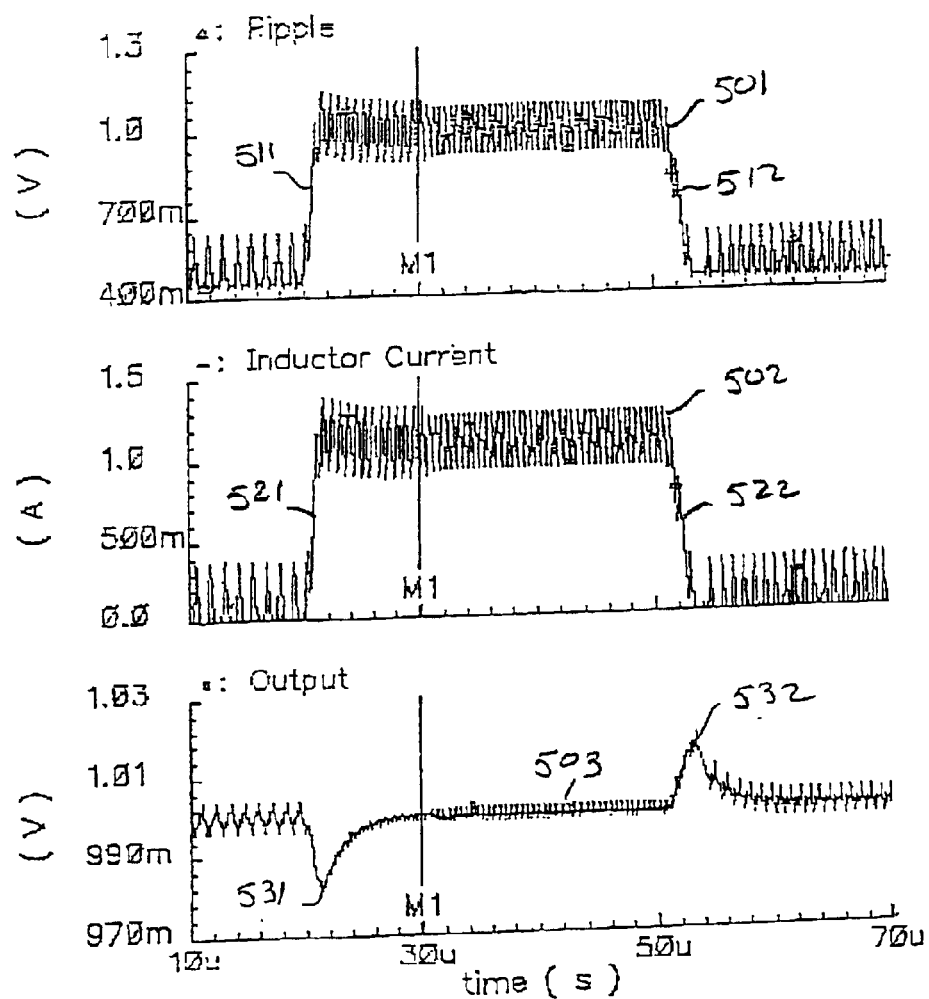
FIG. 5 is a timing diagram showing waveforms associated with the operation of the synthetic ripple regulator of FIGS. 3 and 4.

The operation of the synthetic ripple regulator of FIGS. 3 and 4 may be understood with reference to the set of waveform timing diagrams of FIG. 5. For purpose of providing a non-limiting example, the regulator voltage is set at a value of Reference=1 VDC and the hysteresis comparator 10 trips with +/−100 mV of hysteresis. The inductance of inductor 50 is 1 $\mu$H and the output capacitance is 10 $\mu$F. The line M1 (at the 30 $\mu$sec time mark) represents a change in input voltage from a value on the order of 3.6 VDC prior to M1 to a value on the order of 4.2 VDC at M1 and thereafter.

The upper waveform 501 corresponds to the ripple voltage generated across the ripple voltage capacitor 120; the middle waveform 502 is the current through inductor 50, and the lower waveform 503 is the output voltage at node 55. The similarity of the respective ripple and inductor current waveforms 501 and 502 is readily apparent, as shown by respective step transitions 511/521 and 512/522 therein, at t=20 μs and t=50 μs. As shown in waveform 502, the converter is initially supplying an inductor current on the order 100 mA for an input supply voltage of 3.6 VDC. This inductor current is discontinuous and the switching frequency has a relatively stable value on the order of 900 kHz.

Figure 1:
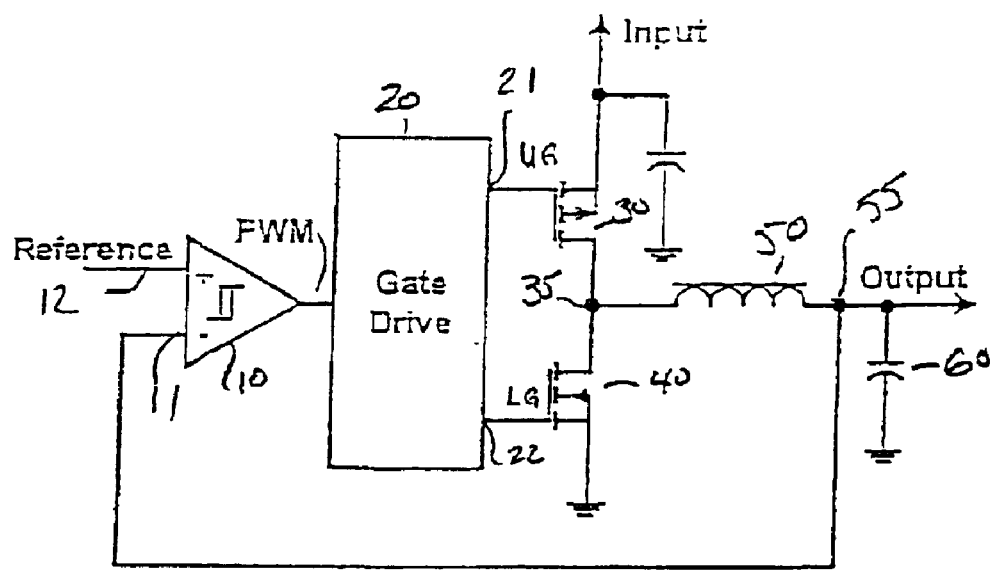
FIG. 1 diagrammatically illustrates the general architecture of a conventional ripple regulator-based DC—DC voltage converter.
Figure 2:
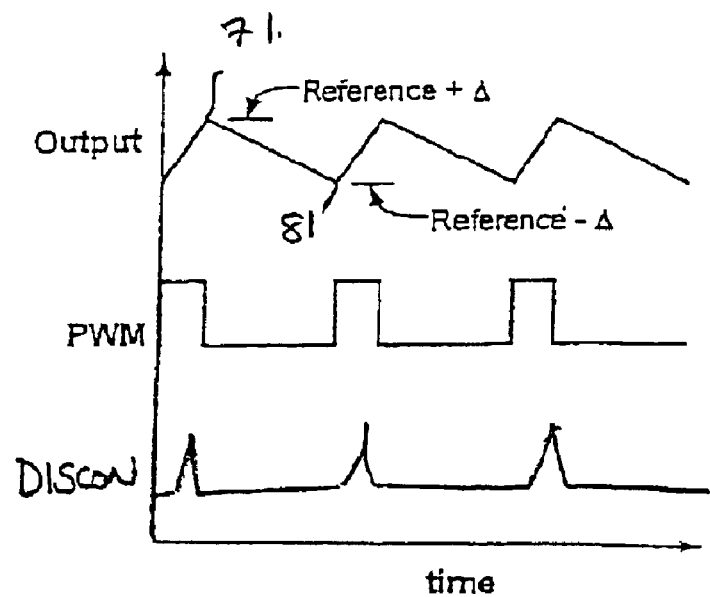
FIG. 2 is a timing diagram showing PWM and output voltage waveforms associated with the operation of the ripple regulator-based DC—DC voltage converter of FIG. 1.

As transient 521 (t=20 μs) in waveform 502, there is a stepwise (X10) increase in the load current from 100 mA to a value on the order of 1 A, and the switching frequency increases to a frequency on the order of 1.5 MHz. From the output voltage waveform 503, it can be seen that the amount of ripple 531 occurring at this transient is relatively small (on the order of only +/−3 mV, which is well below that (+/−100 mV) of the prior art regulator of FIG. 1, during discontinuous operation, where load current=100 mA, and then drops to +/−1.5 mV).

At the M1 or t=30 μs time mark, there is a stepwise increase in input voltage from 3.6 VDC to 4.2 VDC, and the switching frequency increases to almost 2.3 MHz, yet the levels of each of waveforms 501, 502 and 503 remain stable. Subsequently, at t=50 μs, there is a step transient 512 in the inductor/load current waveform 501, which drops back down from 1 A to 100 mA, and the switching frequency settles to a value on the order of 1.3 MHz. As can be seen in the output voltage waveform 503, like the ripple 531 occurring at the t=20 μs transient, the amount of ripple 532 for this further transient is also relatively small (on the order of only +/−3 mV and dropping to +/−1.5 mV), so that the output voltage is effectively regulated at a value on the order of the voltage Reference of 1 VDC.

As will be appreciated from the foregoing description, the synthetic ripple regulator of the present invention is effective to replicate the waveform ripple current through the output inductor, and use this auxiliary mirrored waveform to control toggling of the hysteretic comparator. Using such a reconstructed current for ripple regulation results in low output ripple, input voltage feed forward, and simplified compensation. As an alternative to synthesizing an auxiliary ripple waveform based upon the voltage across the output inductor, a summing node with the ripple referenced to ground may be used. Also, the ramp current can be predetermined for applications that have fixed input and output voltage levels. Further, the transconductance amplifier can be connected to a gated input signal instead of the phase node.

Figure 6:
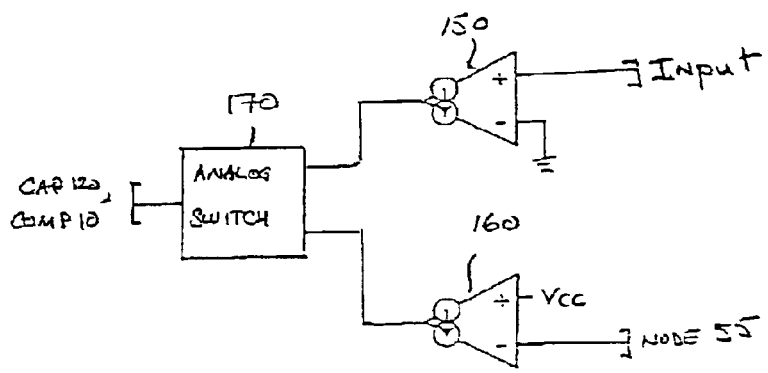
FIG. 6 shows the transconductance amplifier of FIG. 4 implemented as two independently controlled transconductance amplifiers.

Moreover, the functionality of transconductance amplifier 110 may be implemented as two independently controlled transconductance amplifiers, as shown at 150 and 160 in FIG. 6. In this approach, transconductance amplifier 150 has its input coupled to the input node, while transconductance amplifier 160 has its input coupled to output node 55. The outputs of the amplifiers are selectively switched through an analog multiplexer 170 to capacitor 120 and the inverting (−) input 11 of hysteretic comparator 10. This alternative configuration allows the ramp current to be more precisely controlled for improved linearity.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a DC—DC voltage generator having a controller which generates a pulse width modulation (PWM) switching signal that switchably controls operation of a switching circuit containing first and second electronic switching devices coupled between respective power supply terminals, and having a common node thereof coupled through an inductor to a regulated voltage output terminal, a method of controlling generation of said PWM switching signal comprising the steps of:

(a) coupling said common node to a first input of a transconductance amplifier and coupling said regulated voltage output terminal to a second input of said transconductance amplifier, said transconductance amplifier providing at an output thereof an inductor voltage-representative current proportional to the voltage across said inductor, and supplying said inductor voltage-representative current to a capacitor to produce a ripple waveform;

(b) coupling said ripple waveform produced in step (a) to a first input of a hysteretic comparator, having an output controls the generation of said PWM switching signal, and comparing the output voltage at said output voltage terminal with a prescribed DC reference voltage to produce an error voltage, and coupling said error voltage to a second input of said hysteretic comparator.

2. For use with a DC—DC voltage generator having a controller which generates a pulse width modulation (PWM) switching signal that switchably controls operation of a switching circuit containing first and second electronic switching devices coupled between respective power supply terminals, and having a common node thereof coupled through an inductor to a regulated voltage output terminal, a method of controlling generation of said PWM switching signal comprising the steps of:

(a) coupling an input node for said first electronic switching device to a first transconductance amplifier and coupling said regulated voltage output terminal to a second transconductance amplifier;

(b) controllably coupling outputs of said first and second transconductance amplifiers to a capacitor and to a hysteretic converter to provide an inductor voltage-representative current proportional to the voltage across said inductor, and supplying said inductor voltage-representative current to said capacitor to produce a ripple waveform;

(c) coupling said ripple waveform produced in step (b) to a first input of said hysteretic comparator, having an output controls the generation of said PWM switching signal, and comparing the output voltage at said output voltage terminal with a prescribed DC reference voltage to produce an error voltage, and coupling said error voltage to a second input of said hysteretic comparator.

3. In a DC—DC voltage generator having a controller which generates a pulse width modulation (PWM) switching signal that switchably controls operation of a switching circuit containing first and second electronic switching devices coupled between respective power supply terminals, and having a common node thereof coupled through an inductor to a regulated voltage output terminal, the improvement comprising:

a first coupling circuit that is operative to couple said common node to a first input of a transconductance amplifier and to couple said regulated voltage output terminal to a second input of said transconductance amplifier, said transconductance amplifier providing at an output thereof an inductor voltage-representative current proportional to the voltage across said inductor, and supplying said inductor voltage-representative current to a capacitor to produce a ripple waveform;

a second coupling circuit that is operative to couple said ripple waveform to a first input of a hysteretic comparator, having an output controls the generation of said PWM switching signal; and an error amplifier that is operative to compare the output voltage at said output voltage terminal with a prescribed DC reference voltage to produce an error voltage, and coupling said error voltage to a second input of said hysteretic comparator.

4. For use with a DC—DC voltage generator having a controller which generates a pulse width modulation (PWM) switching signal that switchably controls operation of a switching circuit containing first and second electronic switching devices coupled between respective power supply terminals, and having a common node thereof coupled through an inductor to a regulated voltage output terminal, the improvement comprising:

a first coupling circuit that is operative to couple an input node for said first electronic switching device to a first transconductance amplifier and to couple said regulated voltage output terminal to a second transconductance amplifier, wherein outputs of said first and second transconductance amplifiers are coupled to a capacitor and to a hysteretic converter to provide an inductor voltage-representative current proportional to the voltage across said inductor, said inductor voltage-representative current being supplied to said capacitor to produce a ripple waveform;

a second coupling circuit which is operative to couple said ripple waveform to a first input of said hysteretic comparator, having an output controls the generation of said PWM switching signal; and a comparator which is operative to compare the output voltage at said output voltage terminal with a prescribed DC reference voltage to produce an error voltage, and to couple said error voltage to a second input of said hysteretic comparator.

* * * * *